United States Patent
Schmitz et al.

(10) Patent No.: US 7,681,627 B2
(45) Date of Patent: Mar. 23, 2010

(54) PRIMARY SHAPING METHOD FOR A COMPONENT COMPRISING A MICROSTRUCTURED FUNCTIONAL ELEMENT

(75) Inventors: Georg Schmitz, Aachen (DE); Manfred Grohn, Nörvenich (DE); Jürgen Nominikat, Eschweiler (DE)

(73) Assignee: GROHNO-Guss GmbH, Herzogenrath (DE)

( * ) Notice: Subject to any disclaimer, the term of this patent is extended or adjusted under 35 U.S.C. 154(b) by 0 days.

(21) Appl. No.: 11/238,184

(22) Filed: Sep. 28, 2005

(65) Prior Publication Data

US 2006/0162896 A1 Jul. 27, 2006

Related U.S. Application Data

(63) Continuation of application No. PCT/DE2004/000638, filed on Mar. 26, 2004.

(30) Foreign Application Priority Data

Mar. 28, 2003 (DE) .................. 103 14 373

(51) Int. Cl.
 *B22C 9/04* (2006.01)
 *B22C 7/02* (2006.01)
(52) U.S. Cl. ............................ 164/516; 164/35; 164/45
(58) Field of Classification Search .................. 164/35, 164/45, 516, 361
See application file for complete search history.

(56) References Cited

U.S. PATENT DOCUMENTS

| | | | |
|---|---|---|---|
| 5,681,661 A * | 10/1997 | Kelly .......................... | 428/601 |
| 6,245,849 B1 * | 6/2001 | Morales et al. ............. | 524/442 |
| 6,302,185 B1 * | 10/2001 | Lee et al. ..................... | 164/45 |
| 6,511,622 B1 * | 1/2003 | Vihtelic et al. .............. | 264/109 |
| 6,582,197 B2 * | 6/2003 | Coulson .................. | 416/241 R |
| 6,648,056 B1 | 11/2003 | Kaladjian | |

FOREIGN PATENT DOCUMENTS

| | | |
|---|---|---|
| DE | 38 31 129 A1 | 3/1990 |
| DE | 43 07 869 A1 | 9/1994 |
| DE | 102 07 279 A | 10/2002 |
| DE | 101 54 756 C | 11/2002 |
| EP | 0 838 286 A1 | 4/1998 |
| JP | 49 044934 A | 4/1974 |
| JP | 60 199542 A | 10/1985 |
| JP | 01 053728 A | 3/1989 |
| JP | 2 054784 A | 2/1990 |
| RU | 2 007 256 C1 | 2/1994 |
| RU | 2 048 237 C1 | 11/1995 |
| RU | 2 126 308 C1 | 2/1999 |

OTHER PUBLICATIONS

"Siloxane Polymers for High-Resolution, High-Accuracy Soft Lithography", H. Schmid, B. Michel, Macromolecules 33, 2000, p. 3042.
Micropattemded Ceramics by Casting into Polymer Molds, U.P. Schönholzer et al., J. Amer. Soc. 85 [7] 2002, p. 1885.
"Ultrafast and Direct Imprint of Nanostructures in Silicon", St.Y. Chou et al., Nature, vol. 417, 2002, p. 835.
"Guidance Document for Testing Orthopedic Implants with Modified Metallic Surfaces Apposing Bone or Bone Cement", U.S. Food and Drug Administration Feb. 2000.

\* cited by examiner

*Primary Examiner*—Kevin P Kerns
(74) *Attorney, Agent, or Firm*—Henry M. Feiereisen; Ursula B. Day

(57) ABSTRACT

A method is disclosed for molding a component with at least one microstructured functional element, which is configured intentionally with a defined structure, in relief, at a defined point on the surface of the component in order to specifically fulfill a function. The element has a characteristic dimension in the micrometer range in at least one spatial direction. The component is shaped from a substantially metallic material using a mould. At least one functional element is formed in a negative impression that is configured on the surface of the mould.

20 Claims, No Drawings

PRIMARY SHAPING METHOD FOR A COMPONENT COMPRISING A MICROSTRUCTURED FUNCTIONAL ELEMENT

CROSS-REFERENCES TO RELATED APPLICATIONS

This application is a continuation of prior filed copending PCT International application no. PCT/DE2004/000638, filed Mar. 26, 2004, which designated the United States and on which priority is claimed under 35 U.S.C. §120 and which claims the priority of German Patent Application, Serial No. 103 14 373.4, filed Mar. 28, 2003, pursuant to 35 U.S.C. 119(a)-(d).

BACKGROUND OF THE INVENTION

The invention relates to a primary shaping method for a component having at least one microstructured functional element, which is configured intentionally with a defined reliefed structure at a defined point on the surface of the component in order to specifically fulfill a function and which comprises, in at least one spatial direction, a characteristic dimension in the micrometer range, said component being shaped from a substantially metallic material using a molding tool. As compared to a component having a purely macroscopic function, such a component additionally comprises a reliefed, microstructured and, as a result thereof, functionalized surface.

Shaping methods substantially form the three-dimensional shape of a component without changing its mass. Primary shaping methods, which, from the liquid or ductile or from the granular or powdery aggregate state (in the classification in accordance with DIN 8580)—create the first three-dimensional shape, and primary shaping methods, which change a three-dimensional shape in the solid aggregate state through pressure, tensile and compressive loads, bending or pushing loads (in the classification in accordance with DIN 8580) are known.

In this context, the molding tool is the tool by means of which the three-dimensional shape of the component is imposed. In the context of the shaping method, the material deposits in its respective aggregate state on the surface of the molding tool—for example of a mold cavity in a casting method. A negative of a functional element formed on the surface of the molding tool is thus directly formed in the functional element on the surface of the component that fits the mold. From the great number of known primary shaping methods forming the three-dimensional shape of components from a substantially metallic material, using a molding tool, casting, sintering and liquid-phase sintering will be mentioned in particular herein.

A microstructure is a reliefed surface structure comprising, in at least one spatial direction, a characteristic dimension in the micrometer range—meaning substantially of considerably less than 1 mm. Such a characteristic dimension is for example the depth of an edge offset downward with respect to a surface or the width of a rib placed onto a surface.

Microstructures have been found to be advantageous in many respects. Microstructured surfaces are utilized for example in tribological applications, from aero or fluid-dynamic point of views, because of specific visual properties, for controlling the wettability or non-wettability with liquids and for promoting or preventing organic growth.

A functional element is an element that is intended to perform a defined function thanks to a defined shape. More specifically, a functional element is not an element that performs the defined function at a fortuitous location on a component or by having a fortuitous shape.

A microstructured functional element accordingly is an element that is intentionally and selectively configured to have a defined structure at a defined point on the surface of a component and that has a dimension in the micrometer range which is characteristic of the function.

A periodic or almost periodic arrangement of microstructured functional elements is considered to be a microstructured surface texture, a defined detail of a surface having microstructured elements as the functional region or a functional element (itself composed of smaller functional elements).

Thanks to its reliefed structure in the region comprising the functional element, the surface of the component is either functionalized or has its function optimized there. The flow guidance at the surface of a turbine bucket may for example be significantly improved by a microstructured surface texture.

Beside the material and its microstructure, as well as the macroscopic shape, it is the surface that determines the properties of a component. On the one side, perfectly smooth surfaces have come to represent technical perfection, on the other side, minute structures provide a surface with dirt- and water-repelling functions through what is known as the "Lotus effect", spectacle lenses can be provided with an additionally antireflection coating applied to the surface thereof. The functions of light reflection, flow resistance, heat transfer and friction of a component's surface may also be selectively influenced by microscopic surface structures.

The manufacturing of large microstructured surfaces on plastic materials—at least on planar surfaces—is to be considered to be largely known: surface structures in the micrometer range are formed and replicated, using the comparatively simple methods of soft lithography under normal atmosphere. The PDMS (polydimethyl siloxane) stamps used in soft lithography hereby form structures with characteristic dimensions of less than 100 nm (H Schmid, B Michel, Macromolecules 33, 2000, p. 3042). In the field of plastic materials, optical data carriers constitute moreover an impressive example of a product with a microstructured surface: CD-ROM disks, manufactured on a large scale by injection molding, have structures of less than 1 µm, DVD having structures of even less than 500 nm. The production of a plurality of other surface structures, including but not limited to, biomimetic structures such as "shark skin" on polymers is already known.

On ceramic materials, surface structures in the micrometer range are also reproduced neatly, as has been exemplified by a kind of slip casting in structured PDMS stamps (U P Schönholzer et al. "Micropatterned Ceramics by Casting into Polymer Moulds" J. Amer. Soc. 85 7, 2002, p. 1885). Also known is the manufacturing of structures having a size of as little as 10 nm by pressing into the molten surface of a silicon wafer a quartz disk patterned using electron beam lithography (S Y Chou, Ch Keimel, Jian Gu "Ultrafast and Direct Imprint of Nanostructures in Silicon", Nature 417, 2002, p. 835).

Vapor deposited coatings on metallic components having a roughness in the nanometer range are also known; these coatings however do not have a geometrically defined structure. On the other side, the function of a metallic surface can be influenced within narrow limits by selective, geometrically defined patterning on the microscopic scale using chemical etching, micromachining or laser patterning. Structures geometrically defined in the nanometer range can be produced on small surface portions of a metallic component's surface using electron beam lithography.

FDA standardizes in detail indications as to the microstructure of the surface for approving a modified metallic surface of orthopedic implants: the thickness of a coating, the pore diameter, the shape and dimensions of the material between the pores and the volume percent of the voids must be determined in complex test series through their statistical average and limit values as well as through their standard deviation (U.S. Food and Drug Administration: Guidance Document for Testing Orthopedic Implants with Modified Metallic Surfaces Apposing Bone or Bone Cement. February 2000, http://www.fda.gov/cdrh/ode/827.html.

As compared with plastic components with microstructured surfaces, the production of metallic microstructured functional elements on metallic components manufactured using primary shaping methods is interesting from many point of views because they are less prone to wear and exhibit higher hardness and because they may additionally be utilized at higher temperatures. However, the known methods for modifying the surface structure can be utilized for some few special applications only if they are to be economically efficient, this being due on the one side to their complexity and on the other side to the demands placed on testing and documentation because of the statistical distribution of the properties.

The document DE 101 54 756 C1 discloses a primary shaping method, using a molding tool in the surface of which microscopic cavities are formed by anodic oxidation, directly and without a model—meaning so as to be statistically distributed. The document EP 0 838 286 A1 discloses an investment casting method using a wax model on the surface of which molten wax is sprinkled to form a microporous surface structure, which again is statistically distributed. The document DE 38 31 129 A1 discloses a method for manufacturing a casting mold on the basis of a thermally sensitive model such as textiles, plastic material, wood or leather, with the surface structure of the model being reproduced in the casting mold. The methods disclosed in these documents provide for statistically distributed surface structures but not for a defined reliefed microstructured functional element at a defined point on the surface of the component for selectively performing a function.

In the wider context of the invention, there is known from U.S. Pat. No. 6,511,622 B1 to use a wax "filled" with particles for manufacturing a wax model which in turn is used for investment casting in order to minimize the formation of microscopic defects in the surface of the wax model. The document DE 43 07 869 A1 discloses a primary shaping method for manufacturing a microscopic body as it is utilized in precision engineering, micromechanics, microoptics and microelectronics; it does not disclose the formation of a microstructured functional element on a—macroscopic—component, though.

SUMMARY OF THE INVENTION

It is the object of the invention to provide method approaches, tools and means that open new application fields for primary shaping methods for manufacturing microstructured surfaces on substantially metallic components and to simplify and speed-up these methods and means more specifically with regard to large-scale production and utilization.

In view of the known primary shaping methods, the object is solved, in accordance with the invention, by having at least one functional element shaped in a negative copy thereof that is formed in the surface of the molding tool.

A primary shaping method of the invention permits, concurrently with the patterning of the macroscopic, three-dimensional shape of a component, the manufacturing of the microstructured functional element on the surface thereof. As compared to the known primary shaping methods with subsequent machining of the surface, one working step can be eliminated in the manufacturing of a component having a microstructured functional element as a result thereof.

As compared to the known methods for manufacturing surface structures in the micrometer range on a metallic component, primary shaping methods of the invention can be carried out at considerably lower costs on the one side. On the other side, they allow for the first time the economically efficient manufacturing of large and/or curved surfaces provided with microstructures.

As compared to plastic surfaces, components with such defined structured metallic surfaces are characterized by higher surface hardness and, as a result thereof, by higher mechanical strength, reduced wear and longer life, by the fact that they may be utilized at higher temperatures and exhibit improved electrical and thermal conductivity.

BRIEF DESCRIPTION OF THE DRAWING

None

DETAILED DESCRIPTION OF PREFERRED EMBODIMENTS

The primary shaping method of the invention may be utilized to particular advantage if the component is shaped by solidification of a liquid metal in a cavity of the molding tool. Such primary liquid phase shaping methods allow for the one-step manufacturing of components of almost any complexity having dimensions of between some few millimeters to several meters. In primary shaping methods of the invention, details in the microstructure range can be produced in the surface of the component in one and the same work step.

To carry out such a primary liquid phase shaping method of the invention, the liquid metal is preferably poured into the molding tool. Alternatively, the metal may also be introduced into the molding tool using sintering or liquid phase sintering methods and also in granular or powdery solid state to be liquefied by heating in the molding tool. In the context of thixoforming methods, the metal may also be introduced into the molding tool in the thixothropic, meaning in the plastically ductile state.

A "substantially metallic material" is understood to also refer to a composite material having a metallic matrix and for example ceramic—that is inorganic, nonmetallic—grains or fibers made from silicates, carbides, nitrides, for example hard materials such as tungsten carbide.

In the context of a primary liquid phase shaping method, the molding tool's cavity may be provided before filling with a thin metal layer using current methods such as PVD, CVD, MOCVD, with the coating thickness ranging from a few atomic layers to some micrometers. This permits ensuring that even very fine structures in the surface of the cavity be optimally wetted by the molten metal. The molding tool may more specifically be coated with the same metallic material with which the component will then be cast in the molding tool.

In the context of a primary shaping method, the molding tool, in a primary shaping method, may more specifically be formed from a model. Such type primary shaping methods of the invention more specifically include methods using what are referred to as "disposable molds" such as investment casting and sand casting. Investment casting is a current method for producing filigree structures in metallic components. A metallic permanent mold—which is referred to as a "die"—can be manufactured in the context of a primary shaping method of the invention such as by electric discharge machining or by the investment casting method of the invention. Such type casting methods of the invention more specifically allow for repeated use of the same model and, as a result thereof, for economically efficient series production of components having microstructured functional elements.

Chemical vapor deposition of a thin metal or ceramic layer onto the structured model or the structured mold has been found appropriate to replicate finest structures. The methods used here are for example metal-organic CVD methods in which the metal deposits on the model at low temperatures. Alternatively, the coating material can also be vaporized by bombarding it with a solid body by means of a laser (sputtering).

Alternatively, in the context of a primary shaping method of the invention, permanent molding tools can be assembled from assembly parts or manufactured by metal removing or electric discharge machining methods. In special applications—for example in the context of rapid prototyping—a molding tool may also be manufactured by layered manufacturing methods.

In the context of a primary shaping method of the invention, the functional element is preferably formed on the model and then replicated from the model in the moulding tool. If the same model is used several times, the primary shaping method is simplified and the economic efficiency of the primary shaping method increased with regard to the manufacturing of the negative of the functional element on molding tools that have been produced in series.

Alternatively, the functional element may be placed in the surface of the molding tool in the context of a primary shaping method of the invention by a separately performed reshaping step such as by stamping, by metal removing or electric discharge micromachining or by applying or adding prefabricated standard parts.

On a ceramic shell mold for an investment casting method of the invention, the negative of the functional element can be mounted either in the surface of the ceramic produced by dipping it as described or in the surface of a black wash applied subsequently.

In the context of a primary shaping method of the invention, the model can be removed from the replicated molding tool by melting, vaporizing, dissolving or by any other means. Such primary shaping methods of the invention using what is referred to as a "disposable model", which is used but once, again include investment casting methods. A wax or plastic model is therefore dipped repeatedly in a ceramic slip to construct, layer by layer, the ceramic shell mold. Once the molding tool is completed, the model is removed by melting it away or burning it out. In "lost foam" sand casting, a sand mold is constructed about a foam model, said foam model evaporating when the liquid metallic material is poured into the completed molding tool.

In the context of a primary shaping method of the invention, the model may more specifically be replicated from a primary mold in a primary shaping method. A wax model for an investment casting process of the invention may for example be replicated from a metallic primary mold. This makes economically efficient series production of components with microstructured functional elements possible using a primary shaping method of the invention making use of a "disposable model".

Alternatively, the model can also be assembled from assembly parts or manufactured by metal removing or electric discharge machining methods in the context of a primary shaping method of the invention. In special applications—again in the context of rapid prototyping—the manufacturing of a model using layered manufacturing methods is also possible.

In the context of a primary shaping method of the invention, the negative of the functional element is preferably formed in the primary mold to be replicated from the primary mold to the model. If the same primary mold is used several times, the primary shaping method is simplified and the economic efficiency of the primary shaping method increased, also with respect to the manufacturing of the functional element on models produced in series.

Alternatively, the functional element can also be placed in the surface of the model in the context of a primary shaping method of the invention by a separately performed reshaping step such as by stamping, by metal removing or electric discharge micromachining or by applying or adding prefabricated standard parts.

In the context of a primary shaping method of the invention, the primary mold may more specifically be replicated from a primary model in a primary shaping method. A primary mold for an investment casting process of the invention may for example be replicated from a primary model built for example in a rapid prototyping stereolithography process. This permits to significantly shorten the time required for series production of numerically optimized components having microstructured functional elements to begin, using primary shaping methods of the invention making use of a "disposable model".

Alternatively, the primary mold may again be assembled from assembly parts or manufactured by metal removing or electric discharge machining methods in the context of a primary shaping method of the invention. In principle, it is also possible to manufacture a primary mold using layered manufacturing methods.

In the context of a primary shaping method of the invention, the functional element is preferably formed on the primary model and is replicated from the primary model onto the primary mold. If the same primary model is used several times, the primary shaping method is simplified and the economic efficiency of the primary shaping method increased, also with respect to the manufacturing of the negative of the functional element on primary molds produced in series.

Alternatively, the negative of the functional element can also be placed in the surface of the primary mold in the context of a primary shaping method of the invention by a separately performed reshaping step such as by stamping, by metal removing or electric discharge micromachining or by applying or adding prefabricated standard parts.

In the context of a primary shaping method of the invention, the functional element formed more specifically is a freeform that projects from the surface of the component. A freeform may for example reproduce the shape of a shark's scale so that a plurality of such functional elements will provide the surface of a component with particularly advantageous properties in terms of fluid flow.

The functional element preferably has a characteristic dimension with a length of less than 500 µm, more specifically of less than 300 µm. It is particularly preferred if the length is less than 100 µm, or rather less than 10 µm. Tests showed that structures in the submicrometer range of even less than 100 nm may also be replicated.

The characteristic dimension of the functional element can be in the plane of the component's surface. The functional element may for example be a 10 mm deep notch in the surface of the component. The characteristic dimension may also be perpendicular to a component's surface. The functional element may for example be a cone protruding 50 μm from the surface of the component. With microstructured surface textures in particular, a (mathematically averaged) area can be regarded as the surface and the spacing between various neighboring functional elements or the local distance of the envelope of the relief, as the characteristic dimension.

The functional element may more specifically be a step, with the characteristic dimension being the height of the step with respect to the surface of the component. The step—meaning a substantially linear protrusion projecting from the surface of the component—virtually constitutes in the nanostructure range the elementary shape of a functional element. Unidimensional, meaning really spot-like protrusions, cannot be produced in reality.

Further, in the context of a primary shaping method of the invention, a plurality of functional elements is preferably formed on the component. Elementary functional elements may for example be arranged in the form of a Fresnel lens so as to be optically active—at need in the UV range—or they may constitute the contours of a brand name or logotype to identify the manufacturer. By combining functional elements in the microstructure range, the material can be superficially reinforced—at need as a function of the direction—and tribologic or fluid dynamical effects can be achieved.

In the context of a primary shaping method of the invention, a surface textured functional region is further preferably shaped from functional elements that are periodically arranged in the surface of the component. The functional elements arranged in the component's surface may also be arranged in a graded periodical manner, meaning in such a manner that at least one characteristic dimension, the height with respect to the surface, changes the relative position or the spacing between neighboring functional elements over the surface of the component.

In the context of such a primary shaping method of the invention, it is particularly preferred if a functional region comprises a biomimetic surface structure. A plurality of surface effects occurring in nature and originating in the microstructure range is known. Examples include shark skin, sand skink, lotus leaves and garden cress.

The object is further solved in accordance with the invention by a molding tool for a component having a microstructured functional element, said component being shapeable from a substantially metallic material by means of the molding tool and a surface of the molding tool comprising a negative of the functional elements by means of which the functional element may be formed. The primary shaping method described herein above may be carried out using such a molding tool of the invention.

The molding tool of the invention may more specifically be a disposable ceramic mold. The molding tool of the invention may more particularly include a core comprising the negative of the functional element. A microstructured functional element may also be formed in a cavity of the component by means of such a molding tool of the invention. The negative of the functional element may in turn be installed on a core of the invention, either in the surface thereof or in the surface of a black wash applied subsequently.

The object is further solved in accordance with the invention by a core for a component having a microstructured functional element, said component being adapted to be formed from a substantially metallic material in a cavity of a molding tool including the core, said core comprising a negative of the functional element that may be replicated from the core onto the component. The primary shaping method described herein above may be carried out by means of such a core of the invention.

The object is further solved in accordance with the invention by a core box for a component having a microstructured functional element, said component being adapted to be formed from a substantially metallic material in a cavity of a molding tool including a core that is adapted to be formed in the core box, said core box comprising the functional element that may be replicated from the core box onto the core and from the core onto the component. The primary shaping method described herein above may also be carried out by means of such a core of the invention.

The object is further also solved in accordance with the invention by a model for a component having a microstructured functional element, a molding tool being adapted to be replicated from the model in a primary shaping method, said component being adapted to be formed from a substantially metallic material in a cavity of the molding tool and the model comprising the functional element that may be replicated from the model onto the molding tool and from the molding tool onto the component. The primary shaping method described herein above may be carried out by means of such a model of the invention.

The object is further also solved in accordance with the invention by a primary mold for a component having a microstructured functional element, a model being adapted to be replicated from the primary mold and a molding tool, from the model respectively using a primary shaping method, with the component being adapted to be formed from a substantially metallic material in a cavity of the molding tool, said primary mold comprising a negative of the functional element that may be replicated from the primary mold onto the model, from the model onto the molding tool and from the molding tool onto the component. The primary shaping method described herein above may be carried out by means of such a primary mold of the invention.

Such a primary mold of the invention may more specifically be made from an elastomer. The primary mold may for example be replicated in PDMS from a primary model.

Finally, the object is solved in accordance with the invention by a primary model for a component having a microstructured functional element, a primary mold being adapted to be replicated from the primary model, a model, from the primary mold and a molding tool, from the model, respectively using a primary shaping method, with the component being adapted to be shaped from a substantially metallic material in a cavity of the molding tool, with the primary model comprising the functional element, said functional element being adapted to be replicated from the primary model onto the primary mold, from the primary mold onto the model, from the model onto the molding tool and from the molding tool onto the component. The primary shaping method described herein above may also be carried out by means of such a primary mold of the invention.

EXEMPLARY EMBODIMENTS

To manufacture a turbine bucket from directionally solidified nickel-base superalloy SC16 having an undulated surface structure, a decorative glass foil usual in commerce and having an undulated surface structure is glued on a metallic turbine bucket model used as the primary model, said turbine bucket model being then replicated in PDMS. The decorative glass foil is 120 μm thick. The wax model is manufactured in the thus achieved primary mold, and as a result thereof, the ceramic shell mold that will be used as the molding tool, by dipping it into a slip and coating it with sand. The turbine bucket is cast using the process generally known as the Bridgman casting process.

To manufacture a casting from an aluminum alloy with visible replication of a logotype, this logotype is printed on a foil by means of a laser printer. The lateral structure size of the toner applied onto the foil is about 200 µm, the thickness of the toner layer, about 10 µm. The foil is glued into a permanent molding tool for wax models. In the permanent molding tool, the wax model is manufactured using the full mold process (Shaw process). The aluminum casting is cast using the process generally known as the differential pressure casting process.

To manufacture a test body with finest structures, a primary model in the form of a quartz plate is manufactured using generally known electron beam lithographic processes. This quartz plate has linear structures spaced 4 µm apart and having a width of 4 µm as well and a depth of 200 nm. The primary model is replicated in PDMS to form the primary mold; the wax model from which the shell mold may be produced is manufactured in the primary mold.

For manufacturing simple structured surfaces, it is possible to use commercially available primary molds that are made using for example conventional photolithography. The length spectrum obtainable with simple photolithography includes structures of up to a few micrometers. Primary molds may be used for smaller structures that are for example manufactured using nanoimprint lithography. The structures that can be replicated using this technique are only about 10 nm in size and constitute the limit of present lithography.

As a rule—and in particular if the structures are very fine—surfaces manufactured by lithography may only be produced on planar substrates and with areas in the range of one square centimeter.

Larger microstructured surfaces are produced by modular combination either of these primary models manufactured by lithography or, in accordance with the invention, of models or molding tools replicated from these primary models. Wax models or the primary molds used to manufacture these are reshaped to replicate planar microstructures on three-dimensionally curved simple shape bodies such as half shells, tubes, cylinders, cones and cuboids or on complex cast components such as turbine buckets.

As contrasted to the standard methods for manufacturing primary molds for wax models, so-called wax matrices, in investment casting, jewelry casting or prototype casting, which rely on embedding the molds in hot vulcanisate molding tools under pressure at temperatures of 150° C. and require the use of a release agent, the primary model is, in accordance with the invention, embedded without pressure in an elastomer in order to manufacture the primary mold. To replicate the wax models, the primary mold is evacuated before it is filled with wax in order to prevent microscopic gas bubbles to form in the wax model. The wax is forced under pressure into the primary mold to fill it completely and to thus achieve good replication.

The ceramic molding tools having microstructures are manufactured using known investment casting methods. To increase replication accuracy, the slips and/or embedding materials used are modified by adding ceramic nanopowder. The directional solidification of the metal alloy in the Bridgman process ensures continuous supply and makes it possible to produce components without grain boundary.

Methods of the invention also permit to manufacture components having microstructured functional elements which serve as reshaping tools and transfer the surface structure, in a reshaping procedure, onto another component or semi-finished product such as rollers, embossing rollers, roller pairs, presses, embossing tools and deep-draw molds.

Methods of the invention further enable components having microstructured functional elements to be produced for
  aerodynamic applications such as turbine buckets for aircraft turbines or stationary turbines, turbocharger wheels, valves, exhaust manifolds, intake tubes, nozzles, fans and bullets,
  fluid dynamic applications such as ship's propellers, nozzles, pump housings and impellers, screw conveyors, torpedoes and microreactors,
  medical applications such as heart valves with improved flow characteristics and reduced calcium deposition, implants or dental prostheses with improved bonding and surgical instruments,
  tribological applications such as bearing blocks, cylinder and piston units, runners such as for skates, electric irons, screw conveyors and brake disks,
  use of the abrasive effect of the surface structure of the casting such as for filing and milling,
  surface-specific applications such as catalysts, heat exchangers, cooling elements and microfluidic components,
  wetting specific applications such as car wheels and bicycles, dies for casting, frying pans, cooking pots and microreactors,
  micromechanical applications such as the precise positioning of individual fibers in glass fiber bundles,
  optical applications such as antireflection surfaces, antireflection coatings and molds for lenses,
  reinforcing thin walls,
  aesthetic applications such as jewelry like structured metal tapes and visual surface design in general.

What is claimed is:

1. A molding method for producing a component with at least one microstructured functional element, comprising the steps of:
  producing a microstructure at a predefined area on a cavity-confronting surface of a molding tool;
  introducing a substantially metallic material in the cavity of the molding tool; and
  molding a component in the cavity of the molding tool, thereby reproducing on an outside surface of the component a positive of the microstructure to form a microstructured functional element so as to provide the component at a defined area with a relief-shaped structure sized in a micrometer range in at least one spatial direction for realizing a particular function,
  wherein the functional element has at least one characteristic dimension with the characteristic dimension being a length of less than 100 µm.

2. The molding method of claim 1, wherein the molding step includes the step of forming the component through solidification of a liquid metal in the cavity of the molding tool.

3. The molding method of claim 2, wherein the liquid metal is poured into the cavity of the molding tool.

4. The molding method of claim 1, further comprising the step of applying a thin metal layer on the surface of the molding tool before the molding step.

5. The molding method of claim 1, wherein the molding tool is replicated from a model using a molding process.

6. The molding method of claim 5, wherein the functional element is formed on the model and is replicated from the model onto the molding tool.

7. The molding method of claim 5, wherein the model is removed from the replicated molding tool by a process selected from the group consisting of melting, evaporation, burning, and dissolution.

8. The molding method of claim 5, wherein the model is replicated from a master mold using a molding process.

9. The molding method of claim 8, wherein a negative of the functional element is formed on the master mold and replicated from the master mold onto the model.

10. The molding method of claim 8, wherein the master mold is replicated from a master model using a molding process.

11. The molding method of claim 10, wherein the functional element is formed on the master model and replicated from the master model onto the master mold.

12. The molding method of claim 1, wherein the functional element is a free formed area.

13. The molding method of claim 1, wherein the characteristic dimension is smaller than 10 μm.

14. The molding method of claim 1, wherein a plurality of said functional element is formed on the component.

15. The molding method of claim 14, wherein at least one functional region is formed from functional elements periodically arranged in the surface of the component.

16. The molding method of claim 15, wherein the functional region includes a biomimetic surface structure.

17. The molding method of claim 1, further comprising the step of adding ceramic nanopowder to a slip and/or embedding material for producing the molding tool.

18. The molding method of claim 1, further comprising the step of making the molding tool of metal alloy, and allowing the metal alloy to directionally solidify.

19. The molding method of claim 18, wherein the directional solidification of the metal alloy is executed through a Bridgman process.

20. The molding method of claim 1, wherein the positive relief-shaped structure on the component is formed in the absence of any further refinishing step.

* * * * *